United States Patent

Moser et al.

[19]
[11] 3,718,028
[45] Feb. 27, 1973

[54] TORSIONAL VIBRATOR FOR TESTING PLASTICS MATERIALS

[75] Inventors: Kurt Moser, Fribourg; Beat Hochli, Bern, both of Switzerland

[73] Assignee: Lonza Ltd., Gampel/Valais (Direction: Basel), Switzerland

[22] Filed: March 12, 1971

[21] Appl. No.: 123,763

[30] Foreign Application Priority Data

Oct. 13, 1970 Switzerland..........................1058/70

[52] U.S. Cl. .........................73/15.4, 73/67.3, 73/99
[51] Int. Cl................................................G01n 3/32
[58] Field of Search......73/67.2, 67.3, 99, 67.1, 70.1, 73/71.1, 71.3, 15.4, DIG. 11; 250/237, 224, 217

[56] References Cited

UNITED STATES PATENTS

| | | | |
|---|---|---|---|
| 3,608,366 | 9/1971 | Tokita et al. ...............................73/99 |
| 3,401,266 | 9/1968 | Cook-Yarborough .....250/237 R UX |
| 2,343,063 | 2/1944 | Kent......................................73/71.1 |

FOREIGN PATENTS OR APPLICATIONS

| | | | |
|---|---|---|---|
| 787,544 | 7/1935 | France ........................................73/99 |
| 634,117 | 3/1950 | Great Britain..........................73/70.1 |

*Primary Examiner*—James J. Gill
*Assistant Examiner*—John P. Beauchamp
*Attorney*—Brady, O'Boyle & Gates

[57] ABSTRACT

A torsional vibrator for testing plastics materials having a first loading clamp for retention of one end of a plastics test piece, a vibration body, a second loading clamp rigidly joined to the vibration body for gripping the opposite end of the plastics test piece, a temperature chamber enclosing the plastics test piece, a device for exciting torsional vibrations of a torsion pendulum comprising the plastics test piece, the vibration body and the second loading clamp, and means for measuring the frequency of the pendulum vibrations including a light source and a photoelectric element receiving illumination therefrom and illumination varying means associated with the vibration body and disposed between the light source and photoelectric element.

2 Claims, 3 Drawing Figures

PATENTED FEB 27 1973 3,718,028

Inventors
KURT MOSER
BEAT HÖCHLI
BY Brady, O'Boyle & Gates
ATTORNEYS

TORSIONAL VIBRATOR FOR TESTING PLASTICS MATERIALS

This invention is related to our copending applications Ser. No. 86,461, filed Nov. 3, 1970, now U.S. Pat. No. 3,680,366, and Ser. No. 98,819, filed Dec. 16, 1970.

The present relates to a torsional vibrator for testing plastics materials comprising a first loading clamp for retention of one end of a plastics test piece, a vibration body, a second loading clamp rigidly joined to the vibration body for gripping the other end of the plastics test piece, a temperature box for enclosing the plastics test piece, a device for exciting torsional vibrations of a torsion pendulum comprising the plastics test piece, the vibration body and the second loading clamp.

Devices of this kind serve for the determination of the shear modulus or (modulus of elasticity) of the plastics material, the duration of the vibration of the torsion pendulum being measured and the shear modulus being calculated from this duration of vibration, the moment of inertia of the vibration body with the second loading clamp and from the dimensions of the plastics test piece. During the measurement the plastics test piece is held at a given temperature in the temperature box. The measurement is carried out at different temperatures, since the relation of the shear modulus to the temperature is of interest.

In a known device of this kind (Brit.J.Appl.Phys., 1968, Ser,2, Vol.1,pp 1737 to 1742) the vibration body carries a mirror, which reflects the beam of light from the light source onto a photo-electric cell when the pendulum is in the rest position. In another known device of this kind (Plastics and Polymers 37, 1969,No. 131,pp 469 to 474) the light from a light source is beamed directly onto a photo-electric cell. In this arrangement a bar is used as the vibration body which swings about its perpendicular center and carries weights at both ends. In the rest position of the pendulum this bar is located between the light source and the photo-electric cell, so that it darkens the photo-electric cell.

In these previously proposed torsional vibration devices a short impulse is thus provoked each time the pendulum passes through its rest position, the photo-electric cell being briefly illuminated or the lighting being briefly interrupted. The pendulum frequency is for example half the impulse frequency measured with an electronic frequency meter. The vibration duration corresponds to double the time interval between two consecutive passages through zero or the time interval between one passage and the passage after next through zero. The damping of the vibration, which is a measure for the inherent (internal) friction of the plastic and is for example to be determined from two consecutive amplitudes of a damped pendulum oscillation, cannot be measured with these known devices.

One difficulty in carrying out torsional vibration tests with these known devices consists in the fact that during the vibration tests carried out over a relatively great temperature range the plastics test piece gradually twists (winds up) as a result of elastic fatigue, so that the zero point of the vibrations slowly drifts by an amount which is not negligible by comparison to the vibration amplitudes applied, and can be greater than these. Such a drift of the zero point leads to measurement errors if half the vibration duration is arrived at from two consecutive passages through the zero point or if it is arrived at from between one passage and the passage after next through the zero point that is, between the first and third passages through the zero position and the damping is significant. If the displacement of the zero point exceeds the vibrations in their amplitudes, then measurement is entirely no longer possible, and the series of tests must be discontinued.

It is an object of the present invention to provide a torsional vibration device which mitigates these disadvantages.

The present invention provides a torsional vibrator for testing plastics material, comprising a first loading clamp for retention of one end of a plastics test piece, a vibration body, a second loading clamp rigidly joined to the vibration body for gripping the other end of the plastics test piece, a temperature box for enclosing the plastics test piece, a device for exciting torsional vibrations of a torsion pendulum comprising the plastics test piece, the vibration body and the second loading clamp, and means for measuring the duration of the vibration or frequency of the pendulum vibrations, the measuring means comprising a fixed photo-electric element, a fixed light source for illuminating the photo-electric element, and means for varying the illumination of the photo-electric element by the light source in accordance with the position of the pendulum, the illumination-varying means comprising a first aperture on the vibration body and a fixed second aperture located in front of the photo-electric element or the light source for co-operation with the first aperture.

The expression "aperture" as used herein includes any means for limitation of the section of the light beam from the light source falling upon the photo-electric element, for example an aperture or a shutter blade protruding into a light beam.

The invention will be more readily understood from the following description of an embodiment thereof given by way of example with reference to the accompanying drawing, in which.

Figure 1:
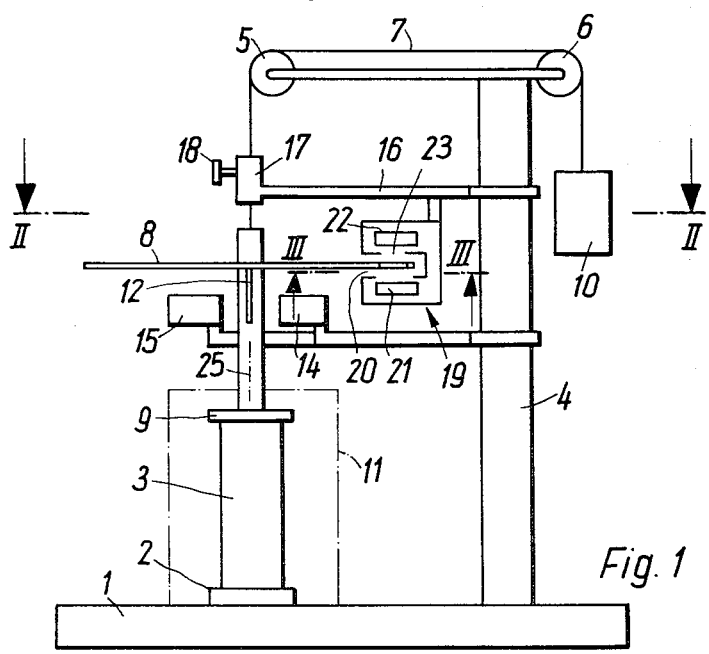
FIG. 1 shows a diagrammatic side view of a torsional vibrator.
Figure 2:
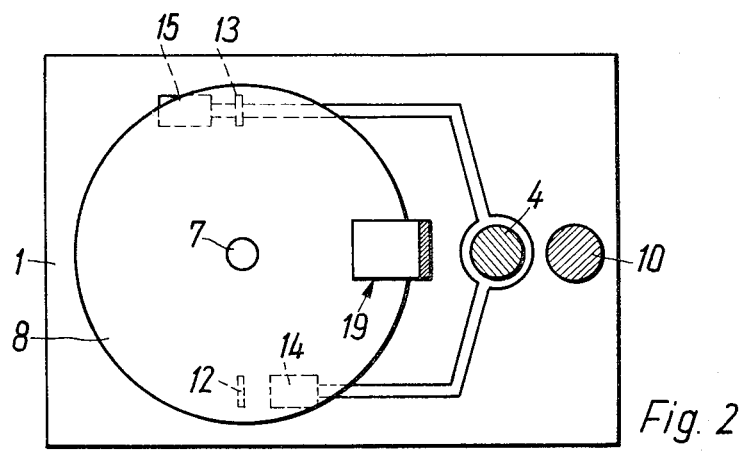
FIG. 2 shows a section along the line II—II in FIG. 1.

According to FIGS. 1 and 2, a base plate 1 has firmly fixed thereto a first loading clamp 2 for that end of a plastics test piece 3 which does not take part in the vibrations. On the base plate 1 stands a column 4 which carries at the top two guide rollers 5 and 6 for a wire 7 that can be twisted practically free from directive force. On one end of the wire 7 is suspended a driven plate a disc type flywheel 8, which is rigidly connected to a second clamping device 9 for the other end of the plastics test piece 3. At the other end of the wire 7 is suspended a counterweight 10 that is only slightly heavier than the total weight of the driven plate 8 and the second loading clamp 9. A temperature box 11 indicated in broken line encloses the loaded plastic test piece 3 and is provided with means for heating that are not shown. The driven plate 8 carries two soft iron parts 12 and 13, for each of which there is an associated fixed solenoid 14 or 15 respectively, through the periodic excitation of which vibrations of the torsion pendulum 3, 8, 9 can be produced.

Figure 3:
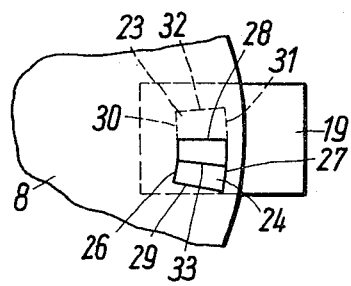
FIG. 3 shows a fragmentary plan view along the line III—III in FIG. 1, on a larger scale.

On an arm 16 of the column 4 is fixed a sleeve 17 through which the wire 7 passes freely. The sleeve 17 is provided with a radial threaded hole at its upper end to receive a clamping screw 18, by means of which the wire 7 can be held fixed in the sleeve 17, in order to fix the vertical position of the driven plate 8 with the loading clamp 9 on changing the plastic test piece 3. The arm 16 carries a housing 19 with a slot 20 into which the driven plate 8 penetrates. In the housing 19 a luminescent diode 21 is located under the slot 20 and a photo-diode 22 with an aperture 23 is disposed above the slot 20. Both the luminescent area of the luminescent diode 21 and also the light-sensitive area of the photo-diode 22 corresponds at least with the opening of the aperture 23. The driven plate 8 is provided with an opening which constitutes an aperture, see FIG. 3. The opening of the aperture 24 is delimited by two curved edges 26, 27 concentric with the torsion pendulum axis 25, and two edges 28, 29 radial to this axis 25. The opening of the aperture 23 is congruent to that of the aperture 24, its edges corresponding to the edge parts 26, 27, 28, 29 are identified as 30, 31, 32, 33. In the rest position of the pendulum the apertures 23 and 24 have the mutual locations shown in FIG. 3, in which one half of the one aperture lies above the other half of the other aperture. In this way one half of the photo-diode 22 is illuminated. This illumination corresponds to a direct current in the current circuit of the photo-diode. When the pendulum vibrates, an alternating current superimposed on this direct current occurs, the frequency of which corresponds to that of the pendulum vibration and the curve shape of which corresponds to the amplitude of the pendulum vibration, assuming that the edge 28 of the aperture 24 does not pass outside the zone between the edges 32 and 33 of the aperture 23. In order also to satisfy this assumption when the plastic test piece winds up from elastic fatigue during the vibration tests, in particular at the higher temperatures, the angle enclosed by the radial edges 28 and 29 of the aperture opening 24 and the similarly great angle enclosed by the edges 32 and 33 of the aperture 23 is not smaller than the sum of this winding up and the greatest vibration amplitude.

The fixed aperture 23 can be disposed in front of the luminescent diode 21 instead of before the photo-diode 22.

Only one of the two apertures needs to be delimited on all sides. This delimitation can for example be a frame which encloses the light-sensitive area of the photo-diode or the illumination area of the luminescent diode. The other aperture can be a shutter blade with an edge radial to the axis of vibration of the pendulum, which is over the middle of the aperture opening in the initial position of the pendulum.

The photo-diode is desirably combined with a transistor to form a photo-transistor.

Obviously it is possible to use an incandescent bulb instead of the luminescent diode and/or a photo-electric element with a smaller light-sensitive area instead of the photo-diode, but optical means (concentration lenses, concave reflector) are then necessary, in relation to which the incandescent bulb or the photo-electric element must be adjusted, in order to light up the opening of the aperture uniformly or to completely contain the light beam, the section of which corresponds to the opening of the aperture. In addition the luminescent diode has the following advantages compared to an incandescent bulb: a considerably longer working life without a decline in the lighting effect, a smaller current consumption, simpler fitting, practically no heating up, a better spectral distribution of the light which is better suited to that of a photo-diode and leads to a negligible influence of daylight.

The measured value which the above-described torsional vibration device supplies is an alternating current superimposed on a direct current and easily separable from this, and which by suitable formation of the aperture corresponds to the torsional vibration. This makes it possible to employ the measured value for the determination of the damping of the plastic, as for example, it is displayed with an oscillograph. Zero point displacements have no influence upon the alternating current as long as the vibrations do not exceed the range of the two apertures. The apertures can be so executed that this range suffices for the zero point displacements occurring in practice.

We claim:

1. A torsional vibrator for testing a test piece of plastics material, comprising
   a first loading clamp for retention of one end of the plastics test piece,
   a disc type flywheel having a central axis of vibration,
   a second loading clamp rigidly connected to said disc type flywheel for gripping the other end of the plastics test piece,
   a temperature box for enclosing the plastics test piece,
   the plastics test piece, said disc type flywheel and said second loading clamp comprising a torsion pendulum,
   a device for exciting torsional vibrations of said torsion pendulum,
   said device including at least one periodically excited fixed solenoid and at least one armature fixed to said disc type flywheel in front of and spaced from the solenoid,
   and means for measuring the duration of the vibration or frequency of the torsion pendulum vibrations,
   said means including a fixed luminescent diode, a first aperture formed in said disc type flywheel at the rim thereof, a fixed second aperture and a fixed photo-electric device,
   the illumination area of the luminescent diode and the light-sensitive area of the photo-electric device at least corresponding to the opening of the first aperture, and
   said photo-electric device positioned on the opposite side of said disc type flywheel from said luminescent diode to be half illuminated by the luminescent diode through the first and second apertures when the disc type flywheel is in its rest position.

2. A device as set forth in claim 1 wherein at least one of the first and second apertures is formed by an opening having two curved edges concentric to the axis of vibration of said disc-type flywheel and two edges radial to this axis, and the other aperture has at least one edge radial to the axis of vibration.

* * * * *